Figure 1:
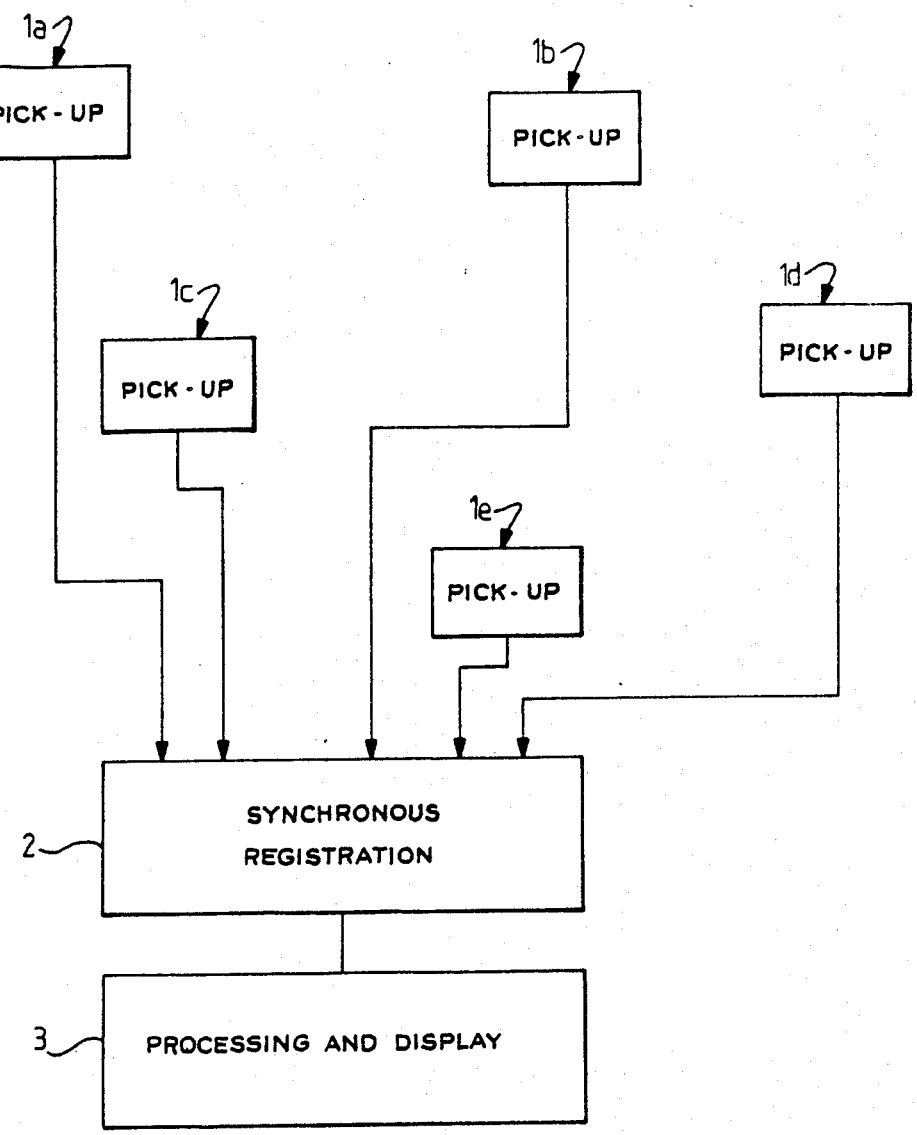

United States Patent [19]

Naville et al.

[11] Patent Number: 4,884,030

[45] Date of Patent: Nov. 28, 1989

[54] METHOD AND SYSTEM FOR ACQUISITION AND SEPARATION OF THE EFFECTS OF ELECTROMAGNETIC FIELDS TO PREDICT EARTHQUAKES

[75] Inventors: Charles Naville, Grigny; Simon Spitz, Paris; Rocroi Jean-Pierre, Fresnes, all of France

[73] Assignee: Compagnie Generale de Geophysique, France

[21] Appl. No.: 178,120

[22] Filed: Apr. 6, 1988

[30] Foreign Application Priority Data

Apr. 9, 1987 [FR] France ................................ 8705023

[51] Int. Cl.$^4$ ........................... G01V 3/08; G01V 3/38
[52] U.S. Cl. ........................................ 324/344; 324/72; 324/334; 324/345; 324/348; 340/690; 364/420
[58] Field of Search ........................ 324/323, 334-339, 324/344-346, , 348-350, 72; 364/420; 340/600, 601, 690

[56] References Cited

U.S. PATENT DOCUMENTS

| | | | |
|---|---|---|---|
| 2,268,106 | 12/1941 | Blau | 324/335 |
| 3,391,334 | 7/1968 | Ruehle | 324/344 |
| 4,010,413 | 3/1977 | Daniel | 324/335 |
| 4,449,099 | 5/1984 | Hoehn | 324/350 |
| 4,535,293 | 8/1985 | Rocroi et al. | 324/336 |
| 4,612,506 | 9/1986 | Varotsos et al. | 324/348 |
| 4,628,299 | 12/1986 | Tate et al. | 340/690 |
| 4,663,593 | 5/1987 | Nekut, Jr. | 324/345 |

FOREIGN PATENT DOCUMENTS 0067924 12/1982 European Pat. Off. .

OTHER PUBLICATIONS

Review of Scientific Instruments, vol. 56, No. 2, Feb. 1985, pp. 278-282, Olson, et al., "Instrument to Measure the Polarization State of Waves".
IBM Journal of Research and Development, vol. 22, No. 5, Sep. 1978, pp. 481-486, Gazdag, "Extrapolation of Seismic Waveforms by Fourier Methods".
ATM: Archiv Fur Technisches Messen Und Industrielle Messtechnik, No. 439, Aug. 1972, pp. R119-R-120, Lenihan, "Elektrische Erdebenuberwachung".
Nature, vol. 315, May 1985, pp. 370-371, Great Britain, Burton, "Electrical Earthquake Prediction".
"Physical Properties of the Variations of the Electric Field of the Earth Preceding Earthquakes 1", Tectonphysics, 110(1984), pp. 73-98.
"Revision de Seismes: LaLongue Marche des Physiciens Grecs", 17 LaRecherche (Jun. 1986), pp. 836-838.

Primary Examiner—Gerard R. Strecker
Attorney, Agent, or Firm—Skjerven, Morrill, MacPherson, Franklin, & Friel

[57] ABSTRACT

The present invention relates to a system for acquisition and separation of the effects of simultaneous sources of electromagnetic field. According to the invention the system comprises an array of n pick-ups (1a ... 1e) connected to registration means (2), the minimum number n of pick-ups per array being equal to 2s+2, where s is equal to a number of simultaneous sources to be analysed.

13 Claims, 5 Drawing Sheets

FIG_1

FIG_2

DETERMINATION OF THE
NUMBER OF ACTIVE SOURCES

```
┌─────────────────────────────────────────────┐
│ MEASUREMENTS OF K OBSERVATIONS ON EACH OF   │
│ n PICK-UPS IF $g_j(\omega,k)$ IS THE TRACE  │
│ ON THE PICK-UP j AT THE INSTANT k           │
│                                             │
│      $g_j(\omega,k) = \sum_{\varepsilon=1}^{b} a_\varepsilon(\omega,k) S_{j\varepsilon}(\omega)$ │
└─────────────────────────────────────────────┘ — 31
                      │
┌─────────────────────────────────────────────┐
│          COVARIANCE MATRIX P                │
│                                             │
│   $\Gamma_{ij}(\omega) = \sum_{k=1}^{K} g_i(\omega) \cdot g_j^*(\omega)$ │
└─────────────────────────────────────────────┘ — 32
                      │
┌─────────────────────────────────────────────┐
│          PROPAGATION OPERATOR               │
│          $P^+ = \Gamma'^{-1} R$             │
│                                             │
│   $\Gamma = \begin{bmatrix} \Gamma_0 & Q^+ & \Gamma'^+ \\ Q & \Gamma_1 & R^+ \\ \Gamma' & R & \Gamma_2 \end{bmatrix}$ │
│                                             │
│        $= S \propto S^+$   WHERE            │
│                                             │
│        $S = \begin{bmatrix} S_0 \\ PS_0 \\ S_1 \end{bmatrix}$ │
└─────────────────────────────────────────────┘ — 33
┌─────────────────────────────────────────────┐
│ DETERMINATION OF $S_0$ ON THE BASIS OF A MODEL │ — 34
├─────────────────────────────────────────────┤
│ DETERMINATION THANKS TO THE OPERATOR P OF THE │
│ SOURCE VECTORS ON THE (n-2s) FOLLOWING PICK-UPS: │
│                                             │
│  $S_{b+k,\varepsilon} = \sum_{i=1}^{b} P_{ki} S_{i\varepsilon}$,  k = 1, 2, ......, n-2b │ — 35
└─────────────────────────────────────────────┘
                      │
                      ▼
                      36           FIG_4A
```

```
                    35
┌─────────────────────────────────────────┐
│     DETERMINATION OF TERMS              │
│     $a_\varepsilon(\omega,k)$    SUCH THAT │
│     $g_{j\varepsilon}(\omega,k) = a_\varepsilon(\omega,k) \, S_{j\varepsilon}(\omega)$ │── 36
│  REPRESENTS FOR THE OBSERVATION k THE SIGNAL │
│  CORRESPONDING TO THE SOURCE $\varepsilon$ AT THE PICK-UP j │
└─────────────────────────────────────────┘
                     │
┌─────────────────────────────────────────┐
│    OBTAINING THE TIME TRACE BY THE      │
│          INVERSE TRANSFORM              │
│    $g_{j\varepsilon}(t,k) = \mathcal{F}^{-1}[g_{j\varepsilon}(\omega,k)]$ │── 40
└─────────────────────────────────────────┘
```

FIG-4B

METHOD AND SYSTEM FOR ACQUISITION AND SEPARATION OF THE EFFECTS OF ELECTROMAGNETIC FIELDS TO PREDICT EARTHQUAKES

FIELD OF THE INVENTION

The present invention relates to a method and a system for acquisition and separation of the effects of simultaneous sources of electromagnetic field.

It finds application particularly in the prediction of earthquakes which will be preceded by precursory electromagnetic signals.

However, the invention is not limited to this application; it is applicable also to the study of the structure and of the composition of the sub-soil.

BACKGROUND OF THE INVENTION

It is in fact known that the electric and magnetic components of the field created by an electromagnetic source as functions of the time or of the pulsation, such as observed on the surface of the ground, are connected to electromagnetic characteristics (conductivity, permeativity, magnetic permeability) of media placed under the influence of this field. These characteristics depend themselves on the nature of the sub-soil. From this, deduction of the structure and nature of the subsoil from observation of electromagnetic field have for a long time been sought.

The present fields of application of sub-soil analysis extend to the general study of the earth (Physics of the Globe), to stratum research (mineral and hyrocarbon) and to civil engineering.

Numerous methods of acquisition and of processing of the measurement of electrical and magnetic components of the field have already proposed.

However in the general manner the methods proposed to data have not given full satisfaction.

In particular, the main methods of acquisition and processing do not permit separation correctly of the useful signal, connected to the source of data, from signals due to other sources (the noise). Nevertheless the quality of the result obtained (estimation of the structure and of the composition of the sub-soil, for example) depend on the quality of the processed signal.

THE INVENTION

The present invention has the object of eliminating these inconveniences.

It proposes a system for acquisition and separation of the effects of simultaneous sources of electromagnetic field comprising an array of n pick-ups connected to registration means in which the minimum number n of pick-ups per array is equal to 2s+2, s being the number of simultaneous sources to be analysed.

As will be explained below, use of such a number of pick-ups permits separation of the different sources in using only the non-diagonal elements of the covariance matrix of the array.

The registration means stores n traces coming from the pick-ups, in a synchronous manner.

The method of acquisition and separation of the effects of simultaneous sources of electromagnetic field comprise according to the invention the registration of n traces $g_j(t)$ coming from an array of n pick-ups in which n is greater than or equal to 2s+2, s being the number of simultaneous sources to be studied.

According to an advantageous characteristic of the invention, the method comprises the successive phases consisting of:

(i) determining the number s of active sources and
(ii) reconstituting the effect of each source.

Preferably, according to the invention, the determination of the number of active sources is made by determining the number of proper dominant values of interspectral matrices:

$$\gamma_{ij} = \sum_{\omega_K} f(\omega_k) g_i(\omega_k) g^*_j(\omega_k) \quad (1)$$

The above notations as well as the method of construction of the interspectral matrices will be explained below in the description.

Thus, the appearance of a new source is detected by the appearance of a new proper dominant value.

Further, in accordance with the invention the reconstitution of the effect of each source comprises preferably the stages consisting of:

determining the vector sources of s sources on s pick-ups, and
determining the vector sources on the other pick-ups with the aid of a propagation operator.

The method thus defined permits isolation of the effect of each active source at the moment of measurement and permits in particular the identification of an electro-magnetic signal precursory of an earthquake.

THE DRAWINGS

Figure 2:
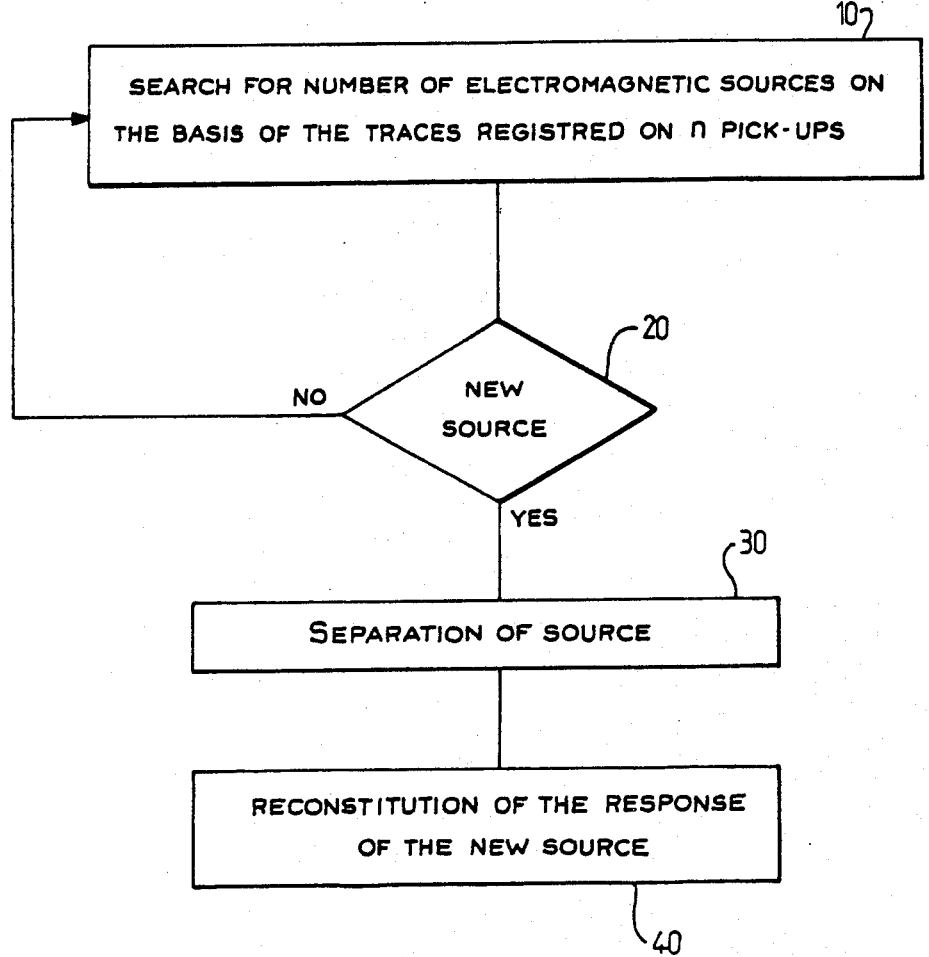
Figure 3:
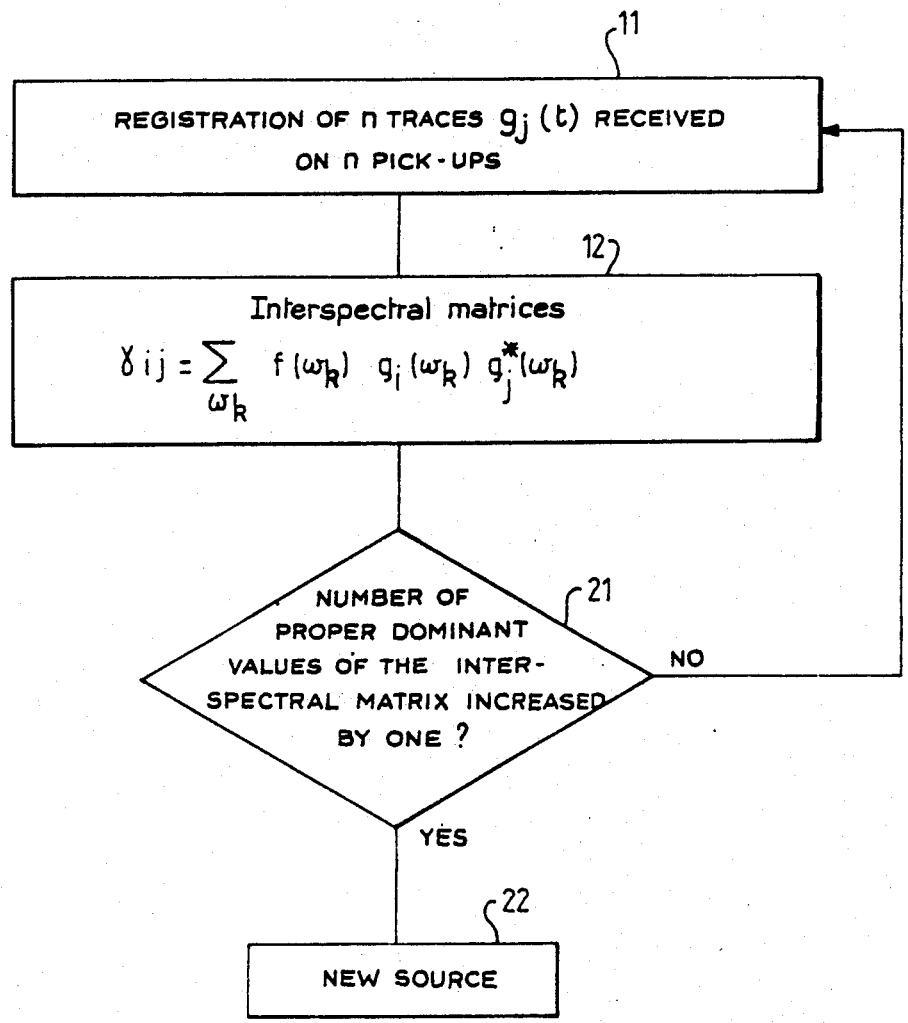

Other characteristics, objects and advantages of the present invention, will appear from reading the detailed description which follows and study of the accompanying drawings, given by way of nonlimitative example and in which:

FIG. 1 shows in a schematic manner a system according to the present invention for acquisition and separation of the effects of simultaneous sources of electromagnetic field, FIG. 2 shows a general flow chart for the method, according to the present invention, for acquisition and separation of a new electromagnetic source for the prediction of earthquakes, FIG. 3 shows a general flow chart of the stages of the method permitting identification of the appearance of the new source.

FIGS. 4A and 4B show a general flow chart of the stages of the method permitting separation of the sources reconstituting the trace of these.

EMBODIMENT OF THE INVENTION

The system according to the present invention, as illustrated in FIG. 1, comprises an array of n pick-ups 1a to 1e sensitive to an electromagnetic field.

Electric and/or magnetometric dipoles can be used. Numerous appropriate pick-up devices are well known to the man skilled in the art. Hence the structure of these pick-ups will not be described in more detail below.

The array can be formed as a local array of n discreet pick-ups.

The array can also be a regional array formed of n local arrays, (each local array of the regional array being considered, on processing, as a pick-up of a local array).

A register 2 stores in a synchronous manner the n traces coming from the n pick-ups. The traces are then processed in means 3 for separation of the effects of the different sources.

According to the invention the number n of pick-ups is greater than 2s+2, where s represents the number of sources to be studied. This arrangement will be explained below.

There will now be described the method of acquisition and separation of the effects of electromagnetic sources according to the invention in its application to the prediction of earthquakes.

As is illustrated schematically in FIG. 2, the method consists essentially, in the first phase, of finding the number of active electromagnetic sources at the moment of registration (stage 10) for detecting the appearance of a new source (stage 20), able for example to be connected to the imminent appearance of an earthquake; then the detection of a new source, in a second phase, of separating the sources (stage 30) for reconstituting the time response of the new source (stage 40).

There will now be described more precisely the operation of the two successive phases.

DETECTION OF THE APPEARANCE OF A NEW SOURCE (FIG. 3)

The method according to the invention utilises n pick-ups sensitive to the electromagnetic field and permits registration of n time traces during an observation period T (stage 11).

The traces are designated by $g_j(t)$ with j: 1, 2 ... n, and by $g_j(\omega)$ the Fourier transforms of these traces.

In dividing the frequency field into p intervals each centered on the frequency $\omega_c$, the registered n traces permit estimation of p interspectral matrices $\gamma$ (stage 12), such as:

$$\gamma_{ij} = \sum_{\omega_k} f(\omega_k) \cdot g_i(\omega_k) \cdot g^*_j(\omega_k) \quad (1)$$

with
i=1 to n,
j=1 to n,
k=1 to m, where
m represents the number of frequences in each interval p considered,
g* representing according to conventional notation the complex conjugate of g, and
$f(\omega_k)$ representing a filter.

Each interspectral matrix $\gamma$ has the dimensions n×n.
Supposing $\gamma'$ is the largest square matrix contained in $\gamma$ and not including any diagonal element of $\gamma$.

The number of active sources, at the frequency $\omega_c$, is given by the number of proper dominant values of $\gamma'$.

If n, the dimension of the interspectral matrix $\gamma$ is even, $\gamma'$ is of the dimension n/2×n/2. $\gamma'$ then possesses (n/2−1) proper dominant values.

If one wishes to determine s sources, it is then necessary that:

n/2−1 ≧ s,  (2)

or n ≧ 2s+2  (3)

On the contrary, if n, the dimension of the interspectral matrix $\gamma$ is uneven, $\gamma'$ is of the dimension $$\frac{n-1}{2} \times \frac{n-1}{2} \cdot \gamma'$$

then possesses at least $$\frac{n-1}{2} - 1$$

proper dominant values.

If one wishes to determine s sources it is necessary that:

$$\frac{n-1}{2} - 1 \geq s \quad (4)$$

or n ≧ 2s + 3.  (5)

The above equations, which can evidently be summarised by the condition (3), then give the number n of pick-ups which must be used according to the number of sources to be identified.

As indicated previously, the analysis of the number of proper dominant values of $\gamma'$ permits determination of the number of active sources. When the analysis of the number of proper dominant values of $\gamma'$ (stage 21) shows the appearance of a new source (stage 22) the processing is followed by a second phase of separation of these sources, illustrated schematically in FIGS. 4A and 4B.

SEPARATION OF THE SOURCES

In the course of this phase, K successive observations $g_j$ each characterised by an observation time T (stage 31) are considered. The number k of observations is greater than the number s of sources. The rank of such an observation will be called k.

Supposing that $g_j(\omega,k)$ is the Fourier transform at the pulsation $\omega$ of the trace registered on the pick-up j during the observation of the rank k.

One constitutes (stage 32) the covariance matrix defined by:

$$\Gamma_{ij}(\omega) = \sum_{k=1}^{K} g_i(\omega) \cdot g^*_j(\omega) \quad (6)$$

with i=1 to n, and j=1 to n.
This matrix can be written in the form $$\Gamma_{ij}(\omega) = S\alpha S^+ \quad (7)$$

where
S is a matrix of dimension n×s
$\alpha$ is a matrix of dimension s×s and
S+ represents the Hermitien transposition of the matrix S.

In fact, the trace $g_j(\omega,k)$ registered on the pick-up j from the observation k is written at the pulsation $\omega$:

$$g_j(\omega,k) = \sum_{\epsilon=1}^{s} a_\epsilon(\omega,k) S_{j\epsilon}(\omega) \quad (8)$$

where
$a_\epsilon$ shows the complex amplitude of the source $\epsilon$ and
$S_{j\epsilon}$ shows the component of the vector source of the source $\epsilon$ on the pick-up j, that is to say the transfer function for the source $\epsilon$ between the pick-up j and the pick-up 1. Suppose $$\Gamma_{ij}(\omega) = \sum_{k=1}^{K} \sum_{\epsilon=1}^{s} \sum_{\beta=1}^{s} S_{i\epsilon}(\omega) a_\epsilon(\omega,k) a^*_\beta(\omega,k) S^*_{j\beta}(\omega) \quad (9)$$

The matrix $\alpha$ is defined by $$\alpha_{\epsilon\beta}(\omega) = \sum_{k=1}^{K} a_\epsilon(\omega,k) a^*_\beta(\omega,k) \quad (10)$$

whilst the matrix S is the matrix of sources $S_{i\epsilon}(\omega)$ with i variant from 1 to n and $\epsilon$ variant from 1 to s.

To determine the signal corresponding to the source $\epsilon$ at the pick-up j comes down to determining $a_\epsilon(\omega,k)$ and $S_{j\epsilon}(\omega)$.

For this the invention proposes the calculation (stage 33) of a propagation operator P which, knowing the components of the s source on s pick-ups, permits automatic determination of the components of the sources on the other pick-ups.

The source matrix S of the dimension n×s can be written:

$$S = \begin{bmatrix} S_o \\ PS_o \\ S_1 \end{bmatrix} \quad (11)$$

where $S_o$ and $S_1$ are regular matrices of dimension s×s and P which represents the propagation matrix is of dimension (n−2s)×s.

At the same time the convariance matrix can be written:

$$\Gamma = \begin{bmatrix} \Gamma_o & Q^+ & \Gamma'^+ \\ Q & \Gamma_1 & R^+ \\ \Gamma' & R & \Gamma_2 \end{bmatrix} \quad (12)$$

where $\Gamma_o$, $\Gamma_2$ and are of dimension s×s
$Q+$ and R are of dimension s×(n−2s) and
$\Gamma_1$ is of dimension (n−2s)×(n−2s).

One can write:

$$\Gamma' = S_1 \alpha S_o^+ \quad (13)$$

and $$R = S_1 \alpha S_o P^+ \quad (14)$$

or $$P^+ = \Gamma'^{-1} R \quad (15)$$

The propagation operator P of dimension (n−2s)×s can then be calculated from the matrix $\Gamma$ without any diagonal term of $\Gamma$ occurring.

The base matrix $S_o$ can be determined either on the basis of traces registered on s pick-ups, in approaching the signal received from a given model (stage 34), or by resolution of the inverse problem defined by the following equation:

$$S_{s+k,j} = \sum_{\epsilon=1}^{s} P_{k,\epsilon} S_{\epsilon j} \quad (16)$$

with k=1,2 ... (n−2s).

For each observation there is calculated (stage 36) the terms $a_\epsilon(\omega,k)$ such that, for the observation k, the signal corresponding to the sources $\epsilon$ at the pick-up j is given by:

$$g_{j\epsilon}(\omega,k) = a_\epsilon(\omega,k) S_{j\epsilon}(\omega) \quad (17)$$

From this, there is obtained (stage 40) the time trace corresponding to the effect of the source $\epsilon$ by inverse Fourier transform:

$$g_{j\epsilon}(t,k) = \mathcal{F}^{-1}(g_{j\epsilon}(\omega,k)) \quad (18)$$

Precise knowledge of the time trace of each source permits amongst other things isolation of a new source for analysing for example whether or not it constitutes a signal precursory of an earthquake (in comparing the useful signal measured and separated with known models of signals precursory to earthquakes, for example the models developed by the Greek physicians P. VAROTSOS, K. ALEXOPOULOS and K. NOMIKOS such as set out in the following document: "La Recherche" No. 178 June 1986, page 836 and Elsevier Sciences Publishers B.V. 1984 "Physical properties of the electromagnetism of the earth preceding Earthquakes", P. VAROTSOS and K. ALEXOPOULOS).

However, as previously indicated, the invention is not limited to the prediction of earthquakes. It also finds application in the study of the structure and the composition of the sub-soil. For this study, the phase of separation of the sources ia automatically carried out, after having determined the number of active sources, without waiting for the appearance of the new source.

We claim:

1. A system for acquisition and separation of components of electromagnetic fields generated by simultaneous sources of electromagnetic field in the earth comprising an array of n pick-ups about at the surface of the earth for picking up the components of the electromagnetic fields, connected to registration means, wherein the minimum number n of pick-ups in the array is equal to 2s+2, s being the number of simultaneous sources to be analyzed, and wherein each pick-up picks up the components of each source.

2. A system according to claim 1, wherein said registration means store n traces coming from said pick-ups in a synchronous manner.

3. A method for acquisition and separation of components of electromagnetic fields generated by simultaneous sources of electromagnetic field in the earth, comprising the step of registering n traces, coming from an array of n pick-ups about at the surface of the earth, for picking up the components of the electromagnetic fields in which n is greater than or equal to 2s+2, s being the number of simultaneous sources to be analyzed, and wherein each pick-up picks up the components from each source.

4. A method according to claim 3, further comprising the steps of:
   (i) determining the number s of active sources; and
   (ii) reconstituting the components of electromagnetic field generated by each source.

5. A method according to claim 4, wherein said step of determining the number of active sources comprises the step of determining the number of proper dominant values of interspectral matrices:

$$\gamma_{ij} = \sum_{\omega_k} f(\omega_k) \cdot g_i(\omega_k) \cdot g_j^*(\omega_k) \quad (1)$$

wherein
$g_i(\omega)$ represents the Fourier transform of a trace $g(t)$
i=1 to n,
j=1 to n,
k=1 to m, where m represents the number of frequencies in each frequency interval considered,
g* represents the complex conjugate of g, and
$f(\omega_k)$ represents a filter.

6. A method according to claim 5, wherein appearance of a new source is detected by appearance of a new proper dominant value.

7. A method according to claim 4, wherein said step of reconstituting comprises the steps of:
accumuating k observations;
determining source vectors for s sources on s pick-ups; and
determining source vectors for other pick-ups by the aid of a propagation operator.

8. A method according to claim 3 applied to prediction of earthquakes.

9. A method according to claim 4, wherein said step of reconstituting comprises the steps of:
accumulating K successive observations $g_j$, wherein the number K of observations is greater than the number s of sources;
constituting the covariance matrix defined by $$r_{ij}(\omega) = \sum_{k=1}^{K} g_i(\omega) \cdot g_j^*(\omega)$$

with i=1 to n and j=1 to n;
arranging the covariance matrix $\Gamma$ in the form of:

$$\Gamma = \begin{vmatrix} \Gamma_0 & Q^+ & \Gamma'^+ \\ Q & \Gamma_1 & R^+ \\ \Gamma' & R & \Gamma_2 \end{vmatrix}$$

where:
$\Gamma_0$, $\Gamma_2$ and $\Gamma$ are of dimension s×s,
$Q^+$ and R are of dimension s×(n−2s), and
$\Gamma_1$ is of dimension (n−2s)×(n−2s);
determining a propagation operator P of dimension (n−2s)×s so that $P^+ = \Gamma'^{-1} R$;
determining a matrix of dimension s×s of the component $S_{\epsilon j}$ of the vector source of the source j, with j=1 to s on the pick-up $\epsilon$, with $\epsilon$=1 to s, so as to determine the source vectors $S_{\epsilon j}$ for s sources on s pick-ups; and
determining the source vectors $S_{s+k,j}$ on other pick-ups on the basis of the following equation:

$$S_{s+k,j} = \sum_{\epsilon=1}^{s} P_{k,\epsilon} S_{\epsilon j},$$

with k=1, 2 ... (n−2s).

10. A method according to claim 9 further comprising the steps of:

determining for each observation the complex amplitude $a_\epsilon(\omega, k)$ of the source $\epsilon$ such that, for the observations k, the signal corresponding to the source $\epsilon$ at the pick-up j is $$g_{j\epsilon}(\omega,k) = a_\epsilon(\omega,k) S_{j\epsilon}(\omega);$$

and then determining the time trace corresponding to the component of the electromagnetic field of the source $\epsilon$ by inverse Fourier transform $$g_\epsilon(t,k) = F[g_{j\epsilon}(\omega,k)].$$

11. A method for acquisition and separation of components of electromagnetic fields generated by simultaneous sources of electromagnetic field in the earth, comprising the steps of:
registering n traces $g_j(t)$ coming from an array of n pick-ups about at the surface of the earth for picking up the components of the electromagnetic fields in which n is greater than or equal to 2s+2, s being the maximum number of simultaneous sources to be studied, and wherein each pickup picks up the components from each source;
determining the number s of active sources by determining the number of proper dominant values of interspectral matrices:

$$\gamma_{ij} = \sum_{\omega_k} f(\omega_k) \cdot g_i(\omega_k) \cdot g_j^*(\omega_k),$$

wherein
$g_i(\omega)$ represents the Fourier transform of the trace $g(t)$,
i=1 to n,
j=1 to n,
k=1 to m, where m represents the number of frequencies in each frequency interval considered,
g* represents the complex conjugate of g,
$f(\omega_k)$ represents a filter;
accumulating K successive observations $g_j$, wherein the number K of observations is greater than the number s of sources;
constituting the covariance matrix defined by:

$$r_{ij}(\omega) = \sum_{k=1}^{K} g_i(\omega) \cdot g_j^*(\omega)$$

with i=1 to n and j=1 to n;
arranging the covariance matrix $\Gamma$ in the form of:

$$\Gamma = \begin{vmatrix} \Gamma_0 & Q^+ & \Gamma'^+ \\ Q & \Gamma_1 & R^+ \\ \Gamma' & R & \Gamma_2 \end{vmatrix}$$

where:
$\Gamma_0$, $\Gamma_2$ and $\Gamma$ are of dimension s×s,
$Q^+$ and R are of dimension s×(n−2s) and
$\Gamma_1$ is of dimension (n−2s)×(n−2s);
determining a propagation operator P of dimension (n−2s)×s so that $P^+ = \Gamma'^{-1} R$;
determining a matrix of dimension s×s of the component $S_{\epsilon j}$ of the vector source of the source j, with j=1 to s on the pick-up $\epsilon$, with $\epsilon$=1 to s, so as to determine the source vectors $S_{\epsilon j}$ for s sources on s pick-ups;

determining the source vectors $S_{s+k,j}$ on other pick-ups on the basis of the following equation:

$$S_{s+k,j} = \sum_{\epsilon=1}^{s} P_{k,\epsilon} S_{\epsilon j},$$

with $k = 1, 2 \ldots (n-2s)$;
determining for each observation the complex amplitude $a_{\epsilon(1,k)}$ of the source $\epsilon$ such that, for the observation $k$, the signal corresponding to the source $\epsilon$ at the pick-up $j$ is given by $$g_{j\epsilon}(\omega,k) = a_\epsilon(\omega,k) S_{j\epsilon}(\omega);$$

and
determining the time trace corresponding to the component of the electromagnetic field of the source $\epsilon$ by inverse Fourier transform $$g_{j\epsilon}(t,k) = F[g_{j\epsilon}(\omega,k)].$$

12. A method for acquisition and separation of components of electromagnetic fields generated by simultaneous sources of electromagnetic field in the earth, comprising the steps of:
registering n traces $g_j(t)$ coming from an array of n pick-ups about at the surface of the earth for picking up the components of the electromagnetic fields in which n is greater than or equal to $2s+2$, s being the maximum number of simultaneous sources to be studied, and wherein each pick-up picks up the components from each source;
determining the number s of active sources by determining the number of proper dominant values of interspectral matrices:

$$\gamma_{ij} = \sum_{\omega_k} f(\omega_k) \cdot g_i(\omega_k) \cdot g_j^*(\omega_k),$$

$g_i(\omega)$ represents the Fourier transform of the trace $g(t)$,
i = 1 to n,
j = 1 to n,
k = 1 to m, where m represents the number of frequencies in each frequency interval considered,
$g^*$ represents the complex conjugate of g,
$f(\omega_k)$ represents a filter; and
if a new source is detected by appearance of a new proper dominant value, determining the components of electromagnetic field of this new source by performing the further steps of:
accumulating K successive observations $g_j$, wherein the number K of observations is greater than the number s of sources;
constituting the covariance matrix defined by:

$$r_{ij}(\omega) = \sum_{k=1}^{K} g_i(\omega) \cdot g_j^*(\omega)$$

with i = 1 to n and j = 1 to n;
arranging the covariance matrix in the form of:

$$\Gamma = \begin{vmatrix} \Gamma_0 & Q^+ & \Gamma'^+ \\ Q & \Gamma_1 & R^+ \\ \Gamma' & R & \Gamma_2 \end{vmatrix}$$

where:
$\Gamma_0$, $\Gamma_2$ and $\Gamma$ are of dimension $s \times s$,
$Q^+$ and R are of dimension $s \times (n-2s)$ and
$\Gamma_1$ is of dimension $(2n-2s) \times (n-2s)$;
determining a propagation operator P of dimension $(n-2s) \times s$ so that $P^+ = \Gamma'^{-1} R$;
determining a matrix of dimension $s \times s$ of the component $S_{\epsilon j}$ for s sources on s pick-ups;
determining the source vectors $S_{s+k,j}$ on other pick-ups on the basis of the following equation:

$$S_{s+k,j} = \sum_{\epsilon=1}^{s} P_{k,\epsilon} S_{\epsilon j},$$

with $k = 1, 2 \ldots (n-2s)$;
determining for each observation the complex amplitude $a_\epsilon(\omega, k)$ of the source $\epsilon$ such that, for the observation k, the signal corresponding to the source $\epsilon$ at the pick-up j is given by $$g_{j\epsilon}(\omega,k) = a_\epsilon(\omega,k) S_{j\epsilon}(\omega);$$

and
determining the time trace corresponding to the component of the electromagnetic field of the source $\epsilon$ by inverse Fourier transform $$g_{j\epsilon}(\omega,k) = F[g_{j\epsilon}(\omega,k)].$$

13. A system for acquisition and separation of components of electromagnetic fields generated by simultaneous sources of electromagnetic field in the earth, comprising:
an array of n pick-ups about at the surface of the earth for picking up the components of the electromagnetic fields in which n is greater than or equal to $2s+2$, s being the maximum number of simultaneous sources to be studied, and wherein each pick-up picks up the components from each source;
means for registering n traces coming from the n pick-ups;
means for determining the number s of active sources by determining the number of proper dominant values of interspectral matrices;

$$\gamma_{ij} = \sum_{\omega_k} f(\omega_k) \cdot g_i(\omega_k) \cdot g_j^*(\omega_k),$$

where:
$g_j(t)$ designates the traces,
i = 1 to n,
j = 1 to n,
k = 1 to m, where m represents the number of frequencies in each frequency interval considered,
$g^*$ represents the complex conjugate of g,
$f(\omega_k)$ represents a filter;
means for accumulating K successive observations $g_j$, wherein the number K of observations is greater than the number s of sources;
means for constituting the covariance matrix defined by:

$$r_{ij}(\omega) = \sum_{k=1}^{K} g_i(\omega) \cdot g_j^*(\omega)$$

with i = 1 to n and j = 1 to n; means for arranging the covariance matrix $\Gamma$ in the form of:

$$\Gamma = \begin{vmatrix} \Gamma_0 & Q^+ & \Gamma'^+ \\ Q & \Gamma_1 & R^+ \\ \Gamma' & R & \Gamma_2 \end{vmatrix}$$

where:
$\Gamma_0$, $\Gamma_2$ and $\Gamma$ are of dimension $s \times s$,
$Q^+$ and $R$ are of dimension $s \times (n-2s)$ and
$\Gamma_1$ is of dimension $(n-2s) \times (n-2s)$;

means for determining a propagation operator $P$ of dimension $(n-2s) \times s$ so that $P^+ = \Gamma'^{-1} R$;

means for determining a matrix of dimension $s \times s$ of the component $S_{\epsilon j}$ of the vector source of the source j, with j=1 to s on the pick-up $\epsilon$, with $\epsilon = 1$ to s, so as to determine the source vectors $S_{\epsilon j}$ for s source on s pick-ups;

means for determining the source vectors $S_{s+k,j}$ on other pick-ups on the basis of the following equation:

$$S_{s+k,j} = \sum_{\epsilon=1}^{s} P_{k,\epsilon} S_{\epsilon j},$$

with k=1, 2 ... (n−2s);

means for determining for each observation the complex amplitude $a_{68}(\omega,k)$ of the source $\epsilon$ such that, for the observation k, the signal corresponding to the source $\epsilon$ at the pick-up j is given by $$g_{j\epsilon}(\omega,k) = a_{\epsilon}(\omega,k) S_{j\epsilon}(\omega);$$

and means for determining the time trace corresponding to the component of the electromagnetic field of the source $\epsilon$ by inverse Fourier transform $$g_{j\epsilon}(t,k) = F[g_{j\epsilon}(\omega,k)].$$

\* \* \* \* \*